United States Patent [19]

Urena

[11] Patent Number: 5,294,251

[45] Date of Patent: Mar. 15, 1994

[54] MICROCRYSTALLINE WAX COATING COMPOSITION

[75] Inventor: Francisco A. J. Urena, Gabriel D'Annunzio, Mexico

[73] Assignee: Myriad Utile, Inc., Hereford, Tex.

[21] Appl. No.: 879,912

[22] Filed: May 8, 1992

[51] Int. Cl.$^5$ .................. C08L 91/08; C09D 191/08
[52] U.S. Cl. ................... 106/271; 106/38.25
[58] Field of Search ............... 106/271, 38.25

[56] References Cited

U.S. PATENT DOCUMENTS

| | | | |
|---|---|---|---|
| 2,379,246 | 6/1945 | Muskat | 220/64 |
| 2,423,171 | 6/1947 | Boak | 117/132 |
| 2,495,285 | 2/1950 | Hoehn | 260/28.5 |
| 2,641,551 | 6/1953 | Smith et al. | 106/14 |
| 3,007,812 | 11/1961 | Smith et al. | 117/123 |
| 3,011,899 | 12/1961 | Bergman | 106/19 |
| 3,785,841 | 1/1974 | Beard | 106/271 |
| 4,021,262 | 5/1977 | Morales Guerrero et al. | 106/271 |
| 4,042,401 | 8/1977 | Newman et al. | 106/14.5 |
| 4,158,571 | 6/1979 | Lynch et al. | 106/271 |
| 4,356,036 | 10/1982 | Kaliardos | 106/271 |
| 4,464,499 | 8/1984 | Umemoto | 106/271 |
| 4,477,281 | 10/1984 | Sasson | 106/14.34 |
| 4,606,945 | 8/1986 | Itoh et al. | 427/318 |

Primary Examiner—David Brunsman
Attorney, Agent, or Firm—Roylance, Abrams, Berdo & Goodman

[57] ABSTRACT

A coating composition having corrosion inhibiting properties, electrical insulating properties, mold release properties and waterproofing properties comprises a dispersion of microcrystalline paraffin wax in a solvent. The coating composition is prepared by heating the microcrystalline wax to about 70° C. to 82° C. and rapidly pouring the wax into a mixture of hexane and xylene at room temperature.

18 Claims, No Drawings

MICROCRYSTALLINE WAX COATING COMPOSITION

FIELD OF THE INVENTION

The present invention is directed to coating compositions to provide microcrystalline wax coatings on articles. More particularly, the invention relates to a microcrystalline paraffin wax-containing compositions for producing water repellent coatings, electrical insulating coatings, and mold release coatings on an article.

BACKGROUND OF THE INVENTION

Metals and articles containing metals typically undergo some form of oxidation when exposed to air and moisture. Iron and iron alloys are particularly prone to corrosion, which if allowed to proceed, detracts from the appearance of the article and can penetrate deeply into the metal to impair its mechanical properties. Most other metals also corrode upon exposure to water and air, although to different extents. For example, aluminum corrodes to produce white specks, while copper corrodes to produce a bluish-green coating. The layer of corrosion on aluminum and copper typically does not penetrate through the metal, although it can affect the desired properties of the metal. In electrical components, for example, even small amounts of corrosion between electrical contacts can result in failure of the components.

It is customary to protect metal parts against corrosion by applying a protective film. Examples of protective coatings which have been extensively used include petroleum base grease-like compositions, plastic compositions such as proxylin type films, and asphalt base varnishes. The grease-like compositions have been found unsatisfactory for many uses due to the poor resistance to abrasion and the low temperature melting encountered during use of the coated article. The asphalt varnishes and plastic coatings provide adequate protection against corrosion although the coatings are difficult to apply and difficult to remove from the metal surfaces. The decomposition of some of these coating compositions may result in free acids which can react with the metal.

A major use of coating compositions is in the prevention of rust on steel, such as automobile bodies. Some processes of applying a corrosion resistant coating use a wax material which is applied to the steel parts. It is generally desirable to form a wax coating of a predetermined thickness on every area of the surface subject to the treatment. Furthermore, the composition must penetrate into narrow spaces of the work piece. The coating composition requires a low viscosity to penetrate the areas to be protected. Low viscosity waxes can be difficult to apply and are difficult to apply in the desired thickness. To achieve the desired thickness, successive dippings in the coating material are required. The dipping process, however, does not permit selective application of the material.

Numerous coating compositions are known to be applied as coatings or protective films to prevent the penetration of air and water. Examples of some of these compositions are disclosed in U.S. Pat. No. 4,477,281, U.S. Pat. No. 3,641,551 and U.S. Pat. No. 4,021,262. Wax treatments using mechanical force to achieve penetration of the wax into the interstices of the article is disclosed in U.S. Pat. No. 4,606,945.

The coating compositions are often difficult to apply and difficult to produce. Many of these compositions further fail to provide adequate penetration into tight spaces and fail to provide a uniform coating.

SUMMARY OF THE INVENTION

Accordingly, an object of the invention is to provide an effective coating composition that is easy to manufacture and easy to apply to an article.

Another object of the invention is to provide a method of producing a coating composition which does not require complex mixing apparatus or numerous ingredients.

A further object of the invention is to produce a coating composition which is stable to ultraviolet light and high temperatures.

Yet another object of the invention is to provide a coating composition which can be easily applied to an article to provide waterproofing properties, corrosion resistant properties, acid resistant properties, electrical insulating properties and mold release properties to the resulting coated article.

The advantages of the invention are basically attained by producing a coating composition prepared by heating microcrystalline paraffin wax above the melting point of the wax to about 70° C. to 82° C. and admixing the melted microcrystalline paraffin wax with a solvent at room temperature consisting essentially of a liquid aliphatic hydrocarbon and a liquid aromatic hydrocarbon. The microcrystalline paraffin wax immediately disperses in the solvent to producing the coating composition. The resulting composition can be applied to an article by spraying, dipping or brushing to provide a uniform, stable coating. The resulting coating is suitable for waterproofing fabrics, inhibiting corrosion of metals, and producing a release coating for molds.

The above-noted advantages can further be attained by heating about 3 to 20 parts by weight of a microcrystalline paraffin wax to about 70° C. to 85° C. and admixing microcrystalline paraffin wax into a solvent consisting essentially of about 70 to 95 parts by weight of hexane and about 5 to 30 parts by weight xylene. Pouring the melted paraffin into the mixture of hexane and xylene produces a violent reaction resulting in a rapid and complete dispersion of the microcrystalline paraffin wax.

Other objects, advantages and salient features of the present invention will become apparent from the following detailed description, which discloses preferred embodiments of the present invention.

DETAILED DESCRIPTION OF THE INVENTION

The disadvantages and limitations of the previous coating compositions and methods of preparing the compositions are obviated by the present invention while providing an effective composition that can easily applied to an article. The coating composition comprises a dispersion of microcrystalline paraffin wax in a suitable organic solvent.

The coating composition is produced by first heating the microcrystalline paraffin wax to at least 70° C. to about 110° C. and preferably to 77° C.-82° C. to completely melt the paraffin wax. The wax may be heated to higher temperatures although it is generally not necessary. Heating the wax above 82° C. increases the risk of fire and personal injury. Thus, it is generally not preferred to heat the paraffin wax to high temperatures.

The solvent is then prepared at ambient or room temperature. Preferably the solvent is maintained between about 20° C. and 30° C. before and during mixing with the microcrystalline paraffin wax. In a preferred embodiment, the solvent is prepared by mixing a liquid aliphatic hydrocarbon with a liquid aromatic hydrocarbon solvent. The melted paraffin wax is then poured quickly into the solvent, which results in a violent reaction and a rapid and complete dispersion of the microcrystalline paraffin wax. The solvent may be stirred while the melted paraffin wax is being added to promote rapid dispersion of paraffin wax in the solvent.

Heating the wax prior to addition to the solvent is believed to result in a complete dispersion of the wax, expel any moisture present in the wax or the solvent, and to enable the resulting coating composition to produce a smooth film formed by small particles of the wax which form upon evaporation of the solvent.

Heating the microcrystalline paraffin wax to 78° C.-82° C. before mixing with the solvent has been found to produce a thermal shock to rupture the microcrystals and to produce rapid dispersion of the wax. The mixing results in a substantially complete dispersion of the microcrystalline paraffin wax. The dispersion enables the formation of a uniform coating with the molecules of the paraffin wax more uniformly aligned on a substrate after evaporation of the solvent. The coating composition is stable for extended periods of time without separation or solidification of the wax.

The microcrystalline paraffin wax is preferably a high molecular weight wax having a molecular weight of about 500-800 g/mole. Commercially available microcrystalline waxes are generally a mixture of straight and branched chain paraffins characterized by a higher molecular weight and a smaller crystal structure compared to other waxes. A suitable commercially available microcrystalline paraffin wax includes the waxes marketed by Acrites y Parafinas Industries, Mexico under the trade name Parapi 90F and by Witco Chemical Co. under the trade name Multiwax.

Microcrystalline paraffin waxes have been found to be particularly suitable for the coating compositions of the invention. Microcrystalline paraffin wax when dispersed in the solvent produces a film after evaporation of the solvent that is flexible and adheres well to the treated surface. The film of microcrystalline wax has less tendency to peel and crack compared to lower molecular weight waxes.

The microcrystalline paraffin wax may used in conjunction with other optional waxes, such as other paraffin waxes of high molecular weight having the formula $C_{36}H_{74}$, and soft paraffins, such as $C_{20}H_{42}$. Other paraffin waxes derived from straight or branched chain hydrocarbons having the generic formula $C_nH_{2n+2}$ may be included. Other optional waxes may include the synthetic waxes, such as chlorinated polyethylene wax.

The solvent system used in the coating composition is at least one hydrocarbon solvent capable of dispersing the melted microcrystalline paraffin wax. In preferred embodiments, the solvent system is a mixture of a liquid aliphatic hydrocarbon, generally having the formula $C_nH_{2n+2}$ where n is at least 5 and a liquid aromatic hydrocarbon, generally having the formula $C_nH_{2n-6}$ where n is at least 6. The solvent is selected to provide sufficient dispersion and/or dissolution of the microcrystalline paraffin wax and to provide a rapid evaporation of the solvent. The preferred aliphatic solvents, which effectively dissolve the microcrystalline paraffin wax and provide the desired rate of evaporation, are the straight and branched chain $C_6$ to $C_{12}$ alkanes. n-Hexane is generally preferred, although other solvents may be used, such as iso-hexane or cyclohexane.

The aromatic hydrocarbon solvent is included in an amount sufficient to reduce the volatility of the solvent system and adjust the rate of evaporation of the solvent. The solvent generally includes about 70% to 100% by volume of an aliphatic hydrocarbon and about 0% to 30% by volume of an aromatic solvent. A preferred solvent is a mixture of about 70% to 95% by volume of an aliphatic hydrocarbon and about 5% to 30% by volume of an aromatic hydrocarbon.

The aromatic solvent may include, for example, benzene, toluene, xylene, trimethyl benzene or other liquid aromatic hydrocarbons. The preferred aromatic solvent a commercial grade of xylene which generally is a mixture of the ortho, meta, and para isomers, with the meta and para isomers predominating.

Additional solvents may also be used as needed to produce the desired dispersion of the microcrystalline paraffin wax penetration of the composition into the treated article. The optional auxiliary solvents include, for example, cyclohexene, acetone, cyclohexanone, methyl ethyl ketone or cycloaliphatic unsaturated hydrocarbons or ketones.

The resulting solvent system is preferably a mixture of an aliphatic hydrocarbon and a liquid aromatic solvent such that the solvent system has a boiling point of between about 50° C. and 250° C., and preferably between about 70° C. and 185° C.

The microcrystalline wax is included in the solvent system in the amount of about 1% to 30% by weight. For most applications the microcrystalline wax is included in the amount of about 5% to 15% by weight.

In producing the composition, it generally simplifies the method by calculating the components based on parts by weight. The coating composition thus comprises 70 to 95 parts of a liquid aliphatic hydrocarbon, 5 to 20 parts of a liquid aromatic hydrocarbon and 3 to 20 parts microcrystalline paraffin wax, where the parts are by weight. In preferred embodiments, the composition comprises 80 to 90 parts hexane, 5 to 15 parts xylene and 4 to 15 parts microcrystalline paraffin wax. Single applications of the coating composition containing as little as 3 parts by weight microcrystalline paraffin wax provide adequate coverage for many purposes, such as for example water repellency. Thicker coatings can be produced on the coated article by increasing the concentration of the microcrystalline paraffin wax.

The coating composition can be applied to the surface of an article to be treated by brushing, spraying, dipping or flooding. In general, the coating composition can be applied to porous and non-porous surfaces to afford coverage of about 70 to 130 square feet per gallon of the coating composition containing about 5 to 15 parts by weight microcrystalline wax. For adequate protection, the article should be coated after evaporation with about 50 g to about 150 g of microcyrstalline wax per 100 square feet.

Other additives may be included in the coating composition as desired. For example, the composition may include dyes, pigments, antioxidants, antibacterial agents, antifungal agents or mixtures thereof.

The coating composition is a sable dispersion of a microcrystalline paraffin wax which is easy to apply and provide uniform coverage. The solvent system is capable of being applied using conventional coating equipment. The solvent quickly evaporates to leave a uniform, temperature stable coating.

The coating composition of the invention has been found to have numerous utilities depending on the concentration of the microcrystalline wax in the solvent. For example, the composition can be used to waterproof fabrics such as tents, sleeping bags, jackets and other clothing. The resulting coating penetrates the fabric to provide a thin coating to repel water but remains permeable to air. The UV absorbing properties of microcrystalline wax further help protect the fabric. Other uses include insulating, protecting and sealing electrical components and appliances, wiring, circuit boards, paper products, leather, stone and brick.

The composition containing 10 to 15 parts by weight microcrystalline wax are particularly suitable for coating metal and particularly articles of iron and steel to produce a waterproof and corrosion resistent coating. The coating is relatively durable and heat stable. The coating after evaporation of the solvent has been found to be stable up to 1250° C. without any visible changes in the coating. It has also been found to produce an effective release coating for molds used in molding plastics, rubber, polystyrene foam concrete and molten metals, such as bronze and aluminum. The composition may further be used as an ice release coating in refrigeration systems and aircraft.

The following non-limiting examples illustrate preferred embodiments of the invention.

EXAMPLE 1

A mixture of 850 ml of commercial grade n-hexane and 100 ml of commercial grade xylene was prepared at ambient temperature. 50 grams of microcrystalline paraffin wax was heated in a separate container to about 80° C. While agitating the n-hexane and xylene mixture at ambient temperature, the microcrystalline paraffin wax was added which resulted in violent reaction to immediately disperse the wax. The resulting coating composition was applied to a piece of steel and the solvent allowed to evaporate. Upon evaporation of the solvent, a white film of microcrystalline wax remained. The steel was heated by a propane torch without any visible change in the white film.

EXAMPLES 2 Through 15

In these examples, the coating composition was prepared substantially in the manner described in Example 1. The proportions of each component and the utility of the resulting composition is set forth in Table I below.

TABLE I

| Example | Microcrystalline paraffin Wax Parts by Weight | n-Hexane Parts by Weight | Xylene Parts by Weight | Utility |
|---|---|---|---|---|
| 2 | 10 | 80 | 10 | waterproofing for fabrics |
| 3 | 5 | 85 | 10 | electrical insulation |
| 4 | 5 | 90 | 5 | mold release coating for thermoplastics |
| 5 | 10 | 80 | 10 | mold release for rubber tires |
| 6 | 15 | 80 | 5 | mold release coating for concrete and metals |
| 7 | 10 | 85 | 5 | mold release coating for polystyrene foam |
| 8 | 15 | 70 | 15 | waterproofing for electrical components |
| 9 | 15 | 85 | 5 | release coating for ice |
| 10 | 4 | 86 | 10 | waterproof coating; UV-blocking agent |
| 11 | 7 | 83 | 10 | fabric and leather waterproofing agent |
| 12 | 5 | 85 | 10 | corrosion resistant coating |
| 13 | 8 | 80 | 12 | corrosion resistant coating |
| 14 | 6 | 85 | 9 | paper coating |
| 15 | 9 | 80 | 11 | waterproofing agent |

While several embodiments have been shown to illustrate the invention, it will be understood by those skilled in the art that various changes and modifications can be made therein without departing from the scope of the invention as defined in the appended claims.

What is claimed is:

1. A liquid coating composition prepared by a process comprising the steps of:
   heating microcrystalline paraffin wax above the melting point of said wax; and
   admixing said microcrystalline paraffin wax with a solvent substantially at room temperature and dispersing said microcrystalline wax, said solvent consisting essentially of a mixture of a liquid aliphatic hydrocarbon and a xylene, said coating composition being stable without separation or solidification of said microcrystalline wax.

2. The composition according to claim 1 wherein said microcrystalline paraffin wax is heated to about 70° C. to 82° C. before admixing with said solvent.

3. The composition according to claim 1 wherein said solvent is continuously mixed while admixing with said microcrystalline paraffin wax.

4. The composition according to claim 1 wherein said solvent consists essentially of hexane and xylene.

5. The composition according to claim 4 wherein solvent consists essentially of about 70 to 95 parts by weight hexane and about 5 to 30 parts by weight xylene.

6. The composition according to claim 1 comprising about 3 to about 20 parts by weight microcrystalline paraffin wax.

7. A process of producing a coating composition comprising:
   heating microcrystalline paraffin wax above its melting point; and
   admixing said melted microcrystalline paraffin wax with a solvent substantially at room temperature and dispersing said microcrystalline wax, said solvent consisting essentially of a mixture of an aliphatic solvent and at least one aromatic solvent to form said composition.

8. The process according to claim 7 further comprising heating said microcrystalline paraffin wax to a temperature of at least 70° C. prior to admixing with said solvent.

9. The process according to claim 7 further comprising heating said microcrystalline paraffin wax to a temperature of about 77° C. to 82° C.

10. The process according to claim 7 wherein said aliphatic solvent is a $C_{6-12}$ alkane.

11. The process according to claim 7 wherein said aliphatic solvent is n-hexane.

12. The process according to claim 7 wherein said aromatic solvent is selected from the group consisting of benzene, toluene, xylene and trimethyl benzene.

13. The process according to claim 7 wherein said aromatic solvent is xylene.

14. The process according to claim 7, said solvent comprising about 70 to 95 parts by weight aliphatic hydrocarbon and about 5 to 30 parts by weight of a aromatic hydrocarbon.

15. The process according to claim 7 comprising admixing said microcrystalline paraffin wax with said solvent in the amount of about 3 to about 20 parts by weight.

16. The process according to claim 7 comprising admixing said microcrystalline paraffin wax with said solvent in the amount of 5 to about 15 parts by weight.

17. A liquid coating composition prepared by the process consisting essentially of:
heating about 3 to 20 parts by weight microcrystalline paraffin wax to about 70° C. to 85° C.; and
admixing said microcrystalline wax with a solvent substantially at room temperature and dispersing said microcrystalline wax, said solvent consisting essentially of about 70 to 95 parts by weight of hexane and about 5 to 30 parts by weight xylene.

18. A liquid coating composition, consisting essentially of:
microcrystalline paraffin wax; and
solvent consisting essentially of a mixture of hexane and xylene;
said composition being stable at room temperature without separation or solidification.

* * * * *